United States Patent [19]

Sharp et al.

[11] 3,885,292
[45] May 27, 1975

[54] METHOD AND APPARATUS FOR CUTTING MOUNTED TIRES FROM THE WHEELS OF JUNKED VEHICLES

[75] Inventors: Allen B. Sharp; Richard A. Hull, both of Ottumwa, Iowa

[73] Assignee: Al-jon Incorporated, Ottumwa, Iowa

[22] Filed: June 24, 1974

[21] Appl. No.: 482,520

[52] U.S. Cl. ............... 29/403; 29/200 D; 29/427; 30/134; 157/13
[51] Int. Cl. ............................................ B23p 19/02
[58] Field of Search ............... 29/200 D, 403, 427; 157/13; 83/598, 601, 602, 603, 604, 605, 606, 925 R; 30/131, 134, 145

[56] References Cited
UNITED STATES PATENTS

| | | | |
|---|---|---|---|
| 216,571 | 6/1879 | Lytle | 30/134 UX |
| 3,284,896 | 11/1966 | Reichborn-Kjennerud | 30/134 |
| 3,294,131 | 12/1966 | Larson | 30/134 X |
| 3,733,941 | 5/1973 | Geyer | 157/13 X |
| 3,803,693 | 4/1974 | Kolkir et al. | 29/200 D |

Primary Examiner—Richard J. Herbst
Assistant Examiner—D. C. Reiley, III
Attorney, Agent, or Firm—Molinare, Allegretti, Newitt & Witcoff

[57] ABSTRACT

An improved apparatus and method for cutting wheel mounted tires so as to facilitate removal of the tires from the wheels of junked vehicles, such as automobiles, trucks and the like, is disclosed. The apparatus includes a pair of parallel, fixed blade members that are separated to form a slot and a movable blade member that is pivotally connected with the fixed blade members and that rotates about an axis of rotation. The movable blade member is guided and supported in the slot between the two fixed blade members during movement of the movable blade member toward and away from the fixed blade members. The cutting or shearing surfaces of the blade members are arranged so that the tire is urged toward the axis of rotation as the movable blade member is moved toward the fixed blade members. A spring-biased grip is mounted on the blade members to grip the tire so as to permit a cut tire to be separated from the wheel on which it had been mounted by moving the wheel with respect to the apparatus.

15 Claims, 8 Drawing Figures

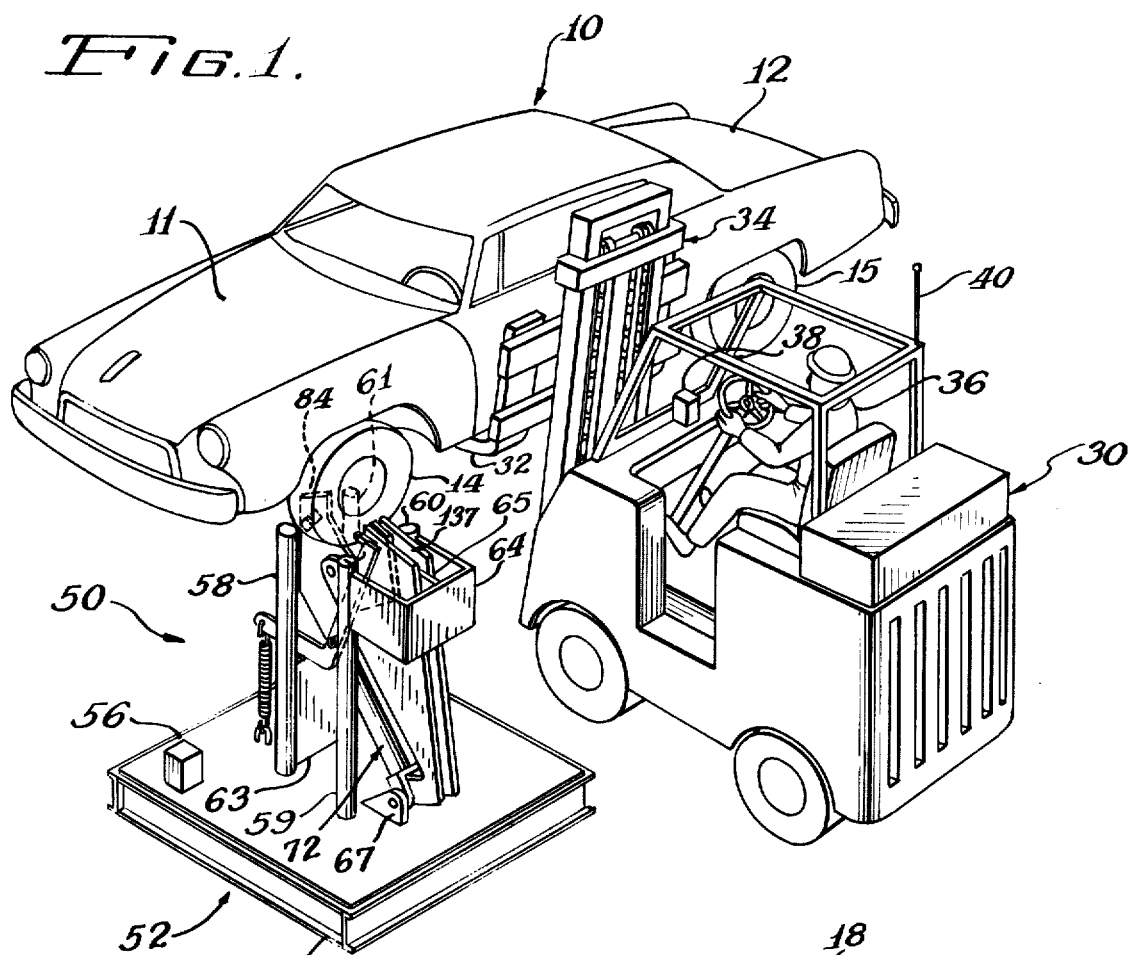
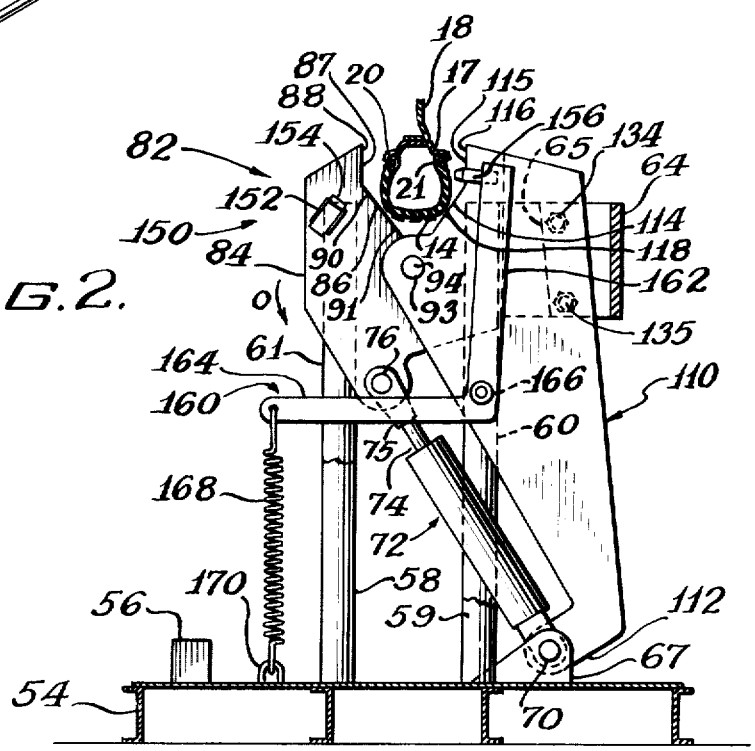

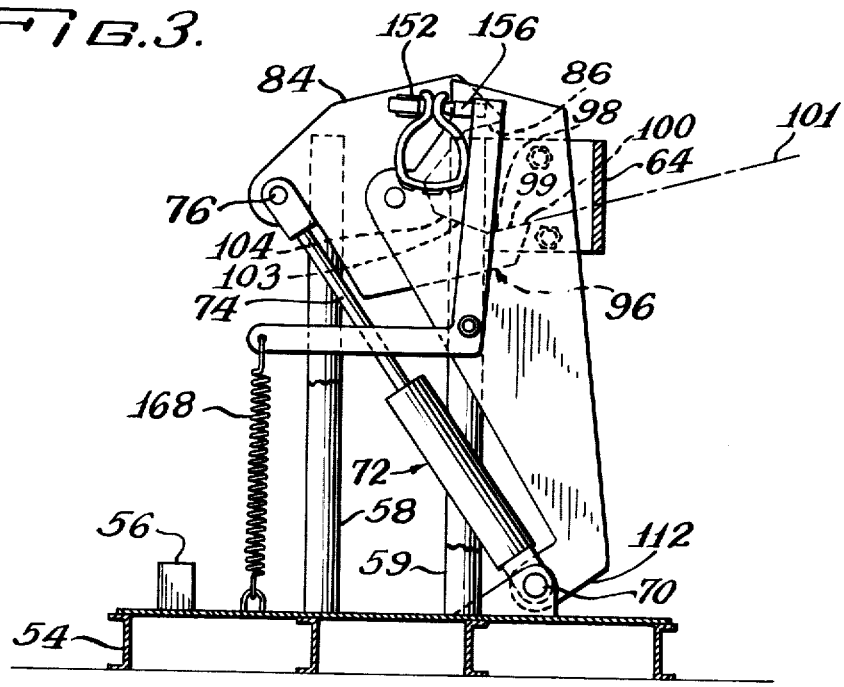
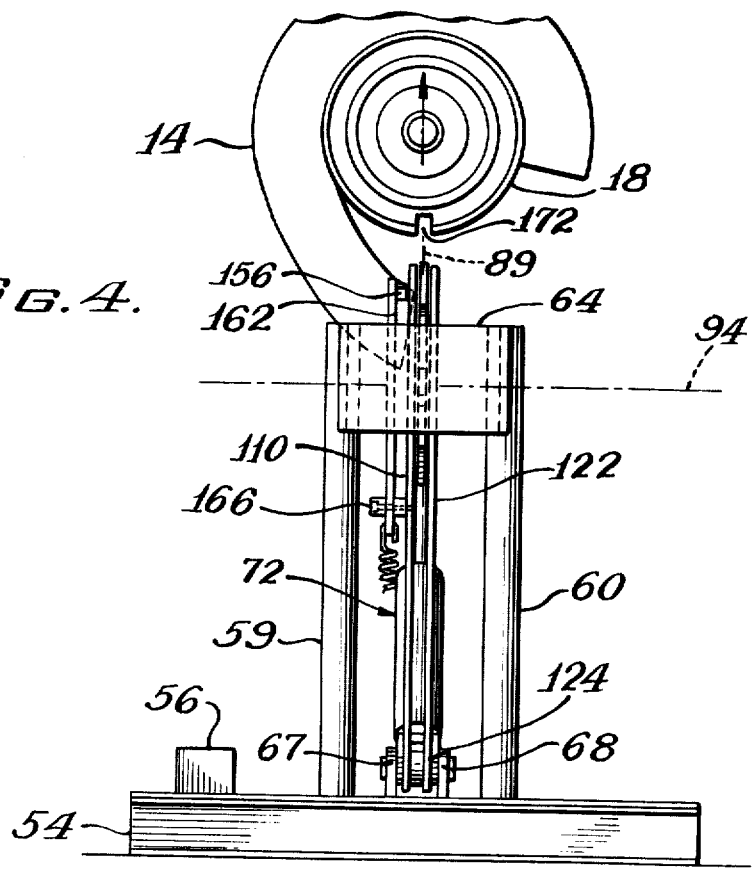

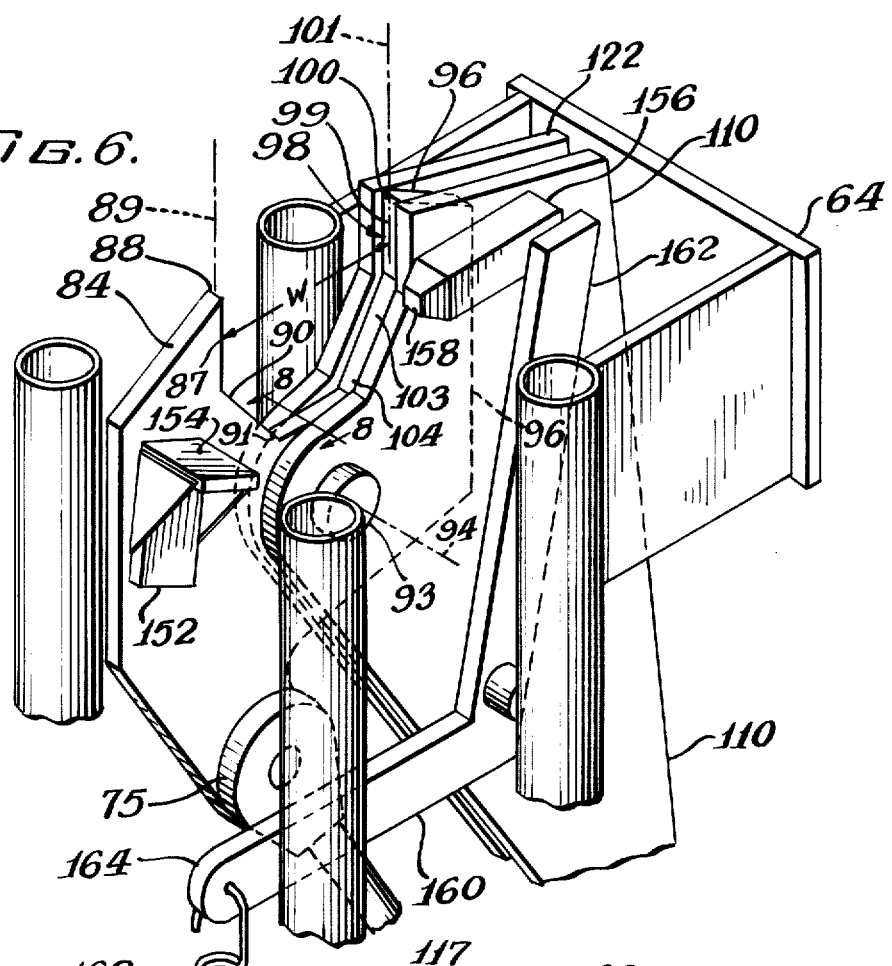
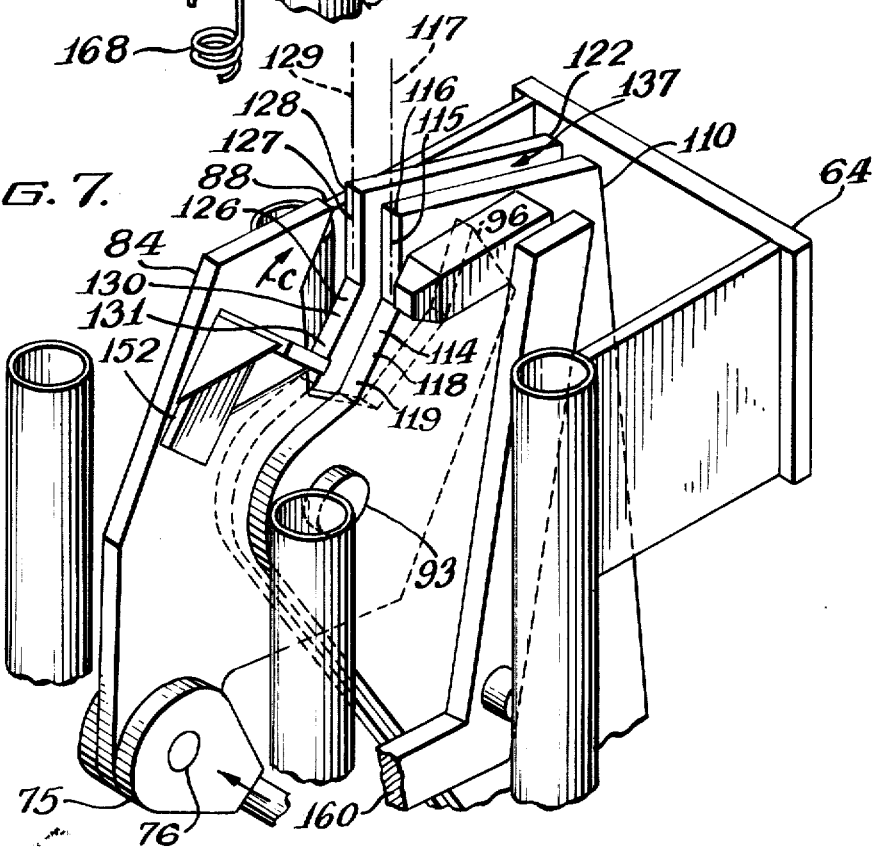

METHOD AND APPARATUS FOR CUTTING MOUNTED TIRES FROM THE WHEELS OF JUNKED VEHICLES

BACKGROUND AND SUMMARY OF THE INVENTION

The present invention relates to improved techniques for cutting wheel mounted tires, and more particularly, to an improved apparatus and method for cutting tires mounted on the wheels of a junked vehicle, such as an automobile, truck and the like so as to facilitate the removal of the tires from the wheels.

Junked vehicles are generally "stripped," i.e., the non-steel parts, such as the engine, transmission, seat cushions, radiator and tires have been removed, before being processed to reclaim the steel in the vehicles. In recent years, the price paid by scrap dealers and processors for junked vehicles has oftentimes not been enough to justify going to the expense of stripping junk vehicles, even though a stripped vehicle generally brings a higher price than an unstripped vehicle. One of the principal reasons why the stripping operation has heretofore been relatively expensive is that much of the operation required the use of manual labor. This is still generally true even though machines as disclosed in U.S. Pat. No. 3,685,128, issued to Allen B. Sharp and Richard A. Hull and assigned to the assignor herein, have now been developed for removing the engine and transmission from junked vehicles without the use of manual labor.

As noted above, the stripping of a junked vehicle includes the removal of the rubber tires mounted on the wheels of the vehicle. Generally it has been standard practice to remove the wheel mounted tires from a junked vehicle by removing the wheels from the vehicle. This standard practice was followed because prior to my invention, there was no practical, economically feasible alternative available, particularly in a typical junk or scrap yard environment. In this regard, the principal problem was that automobile tires include a pair of annular steel cables molded into the tire casing, along the beads of the tires, and unless these cables are cut, it is almost impossible to remove a tire from a wheel, unless, of course, the wheel is first removed from the vehicle, the tire deflated and a mandrel and tools, such as those generally found in service stations, are used.

To remove the vehicle wheels in accordance with the heretofore standard practice, the junked vehicle is rolled over onto its back or side. This generally is done by a fork lift truck or similar vehicle. Then, the operator of the fork lift truck must get down from the truck and use a wrench, generally an air impact wrench, to remove each of the lug nuts from each of the wheels so that the wheels, and tires, can then be manually removed from the vehicle. Frequently the lug nuts are "frozen," and in such cases, the nuts have to be cut off by the use of a torch.

Aside from the fact that this standard practice results in the loss of from 10 to 15 pounds of relatively high grade steel per wheel, the practice had a number of other disadvantages. First and probably foremost, it is a time consuming, and thus relatively expensive, operation since it involves the use of a significant amount of manual labor by the operator of the fork lift truck or by a second man who must be specially employed for this operation. Moreover, regardless of whether the operator of the fork lift truck or a second man is used to remove the wheels, the fork lift truck is obviously not being utilized to the fullest extent during the time when the wheels are being removed. In addition, when the vehicles are rolled over, junk or loose material tends to fall out of the vehicles. This results not only in loss of weight — and this is an important consideration since junked vehicles are sold by weight — but also creates a hazardous working environment, particularly for the hoses associated with the impact wrenches and torches. Furthermore after the wheel mounted tires are removed from the vehicles, they create additional problems in that it is difficult to dispose of them. For example, wheel mounted tires are generally not acceptable for land fill because the air space inside the tires tends to cause the tires to "float" to the surface of the land fill.

In contrast to the heretofore standard practice, the improved apparatus and method of the present invention may be utilized to remove the tires from junked vehicles without removing the wheels. By not having to remove the wheels, the weight of the junked vehicle, as sold to the scrap dealer or processor, is increased by 10 to 15 pounds per wheel. Furthermore during the entire tire removal operation, the operator of the fork lift truck remains at the controls of the truck, and no manual labor is required on the part of the operator, or any other person, in the tire removal operation. In addition to removing tires, the improved machine may also be utilized, after an operator has acquired skill through practice, to remove the gas tank from the junked vehicle. The use of the improved apparatus and method of the present invention thus significantly reduces the cost of stripping junked vehicles so as to substantially increase the profit potential in the sale of junked vehicles to scrap dealers and processors.

More specifically, the improved apparatus of the present invention includes a base, a first movable member of preselected thickness having a first cutting or shearing surface with an upper end and a lower end, and a second and third fixed members, each having a cutting or shearing surface with an upper end and a lower end. The second and third members are mounted on the base so that they are parallel to and are spaced from each other so as to form a slot in which the first member may move. The first member is also mounted on the base so as to be able to pivot about an axis of rotation that is perpendicular to the planes of the first, second and third members. Hydraulic cylinder means are used to move the first member about this axis, between a first, open position, in which the upper end of the cutting surface of the first member is displaced from the upper ends of the cutting surfaces of the second and third members by a first space sufficiently large to receive the width of the tire to be cut, into a second, closed position in which the cutting surfaces of the second and third members cooperate with and guide the cutting surface of the first member to cut the tire from the wheel on which it is mounted. The cutting or shearing surfaces of the members are arranged so that the tire is urged toward the axis of rotation as the members move from their open position to their closed position.

The first member also includes a cleaning finger which is originally positioned in the slot adjacent to the cutting surfaces of the second and third members when the members are in open position and which is utilized to clean rubber and other foreign materials lodged in the slot during the tire cutting operation. The cleaning finger is moved into the slot away from the cutting surfaces of the second and third members as the members are moved from the open position to the closed position, and is moved back to its original position, adjacent to the cutting surfaces of the second and third members, as the members are moved from the closed position to the open position.

The apparatus includes a spring biased grip assembly for gripping the tire when the members are in their closed position. This grip assembly permits a cut tire to be removed from the wheel by moving the vehicle, and thus the wheel, away from the apparatus.

In view of the foregoing, it is a principal object of the present invention to provide an improved apparatus and method for cutting a wheel mounted tire so as to facilitate removal of the tire from the wheel while the wheel is attached to a vehicle.

Another object of the invention is to provide an apparatus and method as described in which the tire is cut by a first member that is movable in a slot formed by second and third members which cooperate with and guide the first member.

Still another object of the invention is to provide an apparatus and method as described in which the members have cutting or shearing surfaces with upper ends that are movable, about an axis of rotation, between an open position and a closed position. The cutting or shearing surfaces are arranged so that the tire is urged downward away from the upper ends and toward the axis of rotation as the members are moved between the open and closed positions whereby the entire tire is firmly retained between the cutting or shearing surfaces and is cut completely.

Yet another object of the invention is to provide an apparatus and method as described in which the slot between the second and third members is automatically cleaned.

Still another object of the invention is to provide an apparatus and method as described in which the tire is gripped when the members are moved to the closed position so that the tire can be removed from the wheel by pulling the wheel away from the members.

These and other objects, advantages, and features of the present invention will become apparent from the following description of the preferred embodiment of the present invention.

DESCRIPTION OF THE DRAWINGS

In the drawings, the same reference numerals are used to indicate like parts throughout the FIGURES wherein:

FIG. 1 is an isometric view illustrating an exemplary vehicle being raised by an exemplary fork lift truck over a preferred form of tire cutter made in accordance with the present invention;

FIG. 2 is a front elevational view of the tire cutter shown in FIG. 1 in the open position wherein the lower half of the tire and wheel rim of the vehicle illustrated in FIG. 1 is shown in cross-section taken along a vertical plane passing through the center of the wheel rim;

FIG. 3 is a front elevational view of the tire cutter and tire shown in FIG. 2 in the closed position;

FIG. 4 is a side elevational view of the tire cutter shown in FIG. 3 after the tire has been severed and is being removed from the vehicle wheel;

FIG. 6 is an enlarged, fragmentary view of the portion of the tire cutter within circle 6 of FIG. 5 illustrated in the open position;

FIG. 7 illustrates the same apparatus shown in FIG. 6 as it is being moved between the open and closed positions.

DESCRIPTION OF THE PREFERRED EMBODIMENT

Figure 8:
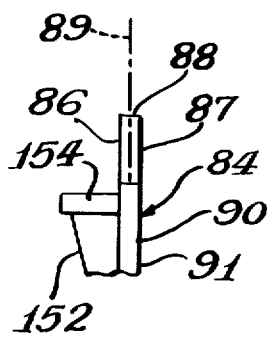
FIG. 8 is a fragmentary, cross-sectional view taken along line 8—8 in FIG. 6.

Referring to FIG. 1, the present invention may be used to advantage to remove the tires from a conventional vehicle 10 having a hood 11 and a trunk lid 12 that is intended to be junked. The vehicle has four conventional rubber tires two of which are shown at 14 and 15, that are mounted to the vehicle by a plurality of lug nuts in the usual manner. These tires are all of conventional design and construction, and with reference to tire 14, as shown in FIG. 2, are held to rim 17 of a standard steel wheel 18 by steel cords or cables 20 and 21 that are embedded in the tire.

Vehicle 10 may be lifted and maneuvered by a conventional self-propelled truck 30 having a fork 32 which is movable in the vertical plane by a hoist 34. The entire vehicle is controlled from a cab by an operator 36. The lift truck preferably includes a transmitter 38 which transmits radio waves from an antenna 40 that are used to control the operation of a tire cutter 50 made in accordance with the present invention.

Referring to FIGS. 1-7, the tire cutter 50, basically comprises an operating assembly 52, a blade assembly 82 and a grip assembly 150. The operating assembly includes a base 54 which is intended to rest on the ground. The operating assembly 52 is controlled by a radio receiver 56 that is tuned to the radio waves being transmitted from antenna 40 on the truck 30. Four cylindrical, vertical posts 58, 59, 60 and 61 have their lower ends securely mounted to base 54. A flat brace 63 is mounted between the lower portions of posts 58 and 61, and a generally U-shaped bracket 64 is rigidly mounted between posts 59 and 60. A free standing flat plate 65 is rigidly attached perpendicular to bracket 64 in the manner shown in order to secure part of blade assembly 82. Brackets 67 and 68 are attached to base 54, and the nonrod end of a conventional double acting hydraulic cylinder 72 is journaled in the brackets by a pin 70 such that the hydraulic cylinder 72 may pivot about the rod 70. The cylinder 72 includes a piston rod 74 whose distal end is fitted with a brace 75 through which a pin 76 is rotatably placed. Hydraulic cylinder lift 72 is connected with a conventional hydraulic system (not shown) and is operated by a hydraulic control system (not shown) which may be activated by radio receiver 56 in a well known manner.

Blade assembly 82 includes a movable blade member 84, a fixed blade member 110 and a fixed blade member 122. Referring to FIGS. 2, 3 and 5-8, movable blade member 84 comprises a cutting or shearing surface 86 having a planar upper segment 87, including an upper end 88, that defines a center line 89. Cutting surface 86 also includes a planar lower segment 90 having a lower end 91. The provision of planar cutting surfaces is an important feature which materially aids the severing or the shearing of a tire and reduces maintenance costs. Blade member 84 is rotatably mounted on a pin 93 that defines an axis of rotation 94 about which the member 84 may pivot. A cleaning finger 96, including a cleaning surface 98, is integrally formed with member 84. Surface 98 has a planar upper segment 99, including an upper end 100, that defines a center line 101, and a planar lower segment 103 having a lower end 104.

Fixed blade member 110 comprises a lower arm portion 112 that is connected to the brackets 67 and 68, and thus to the base 54, by the pin 70. At its upper end, blade member 110 comprises a cutting or shearing surface 114 having a planar upper segment 115, including an upper end 116, that defines a center line 117. Surface 114 also has a planar lower segment 118 having a lower end 119.

Fixed blade member 122 is structurally identical to member 110 and comprises a lower arm 124 that is connected to the brackets 67 and 68, and thus to the base 54, by the pin 70. As best shown in FIG. 7, at its upper end, the blade member includes a cutting or shearing surface 126 having a planar upper segment 127, including an upper end 128, that defines a center line 129. Surface 126 also comprises a planar lower segment 130 having a lower end 131.

Fixed blade members 110 and 122 are substantially parallel to each other and are rigidly held in place, with respect to base 54, by means of bolts 134 and 135 that pass through the blade members and plate 65 (FIG. 2). The space between blade members 110 and 122 defines a slot 137 in which blade member 84 and cleaning finger 96 may move. As shown in FIGS. 4, 6 and 7, the width of slot 137 is substantially the same as the width of cutting surface 86 and cleaning surface 98, although sufficient clearance is provided for free movement of blade member 84 within the slot. In this regard, it should be noted that lines 117 and 129 define a plane that is perpendicular to a plane defined by lines 89 and 101 which bisects slot 137. Similarly the planes defined by the members 110 and 122 are parallel to the plane defined by the member 84.

Figure 5:
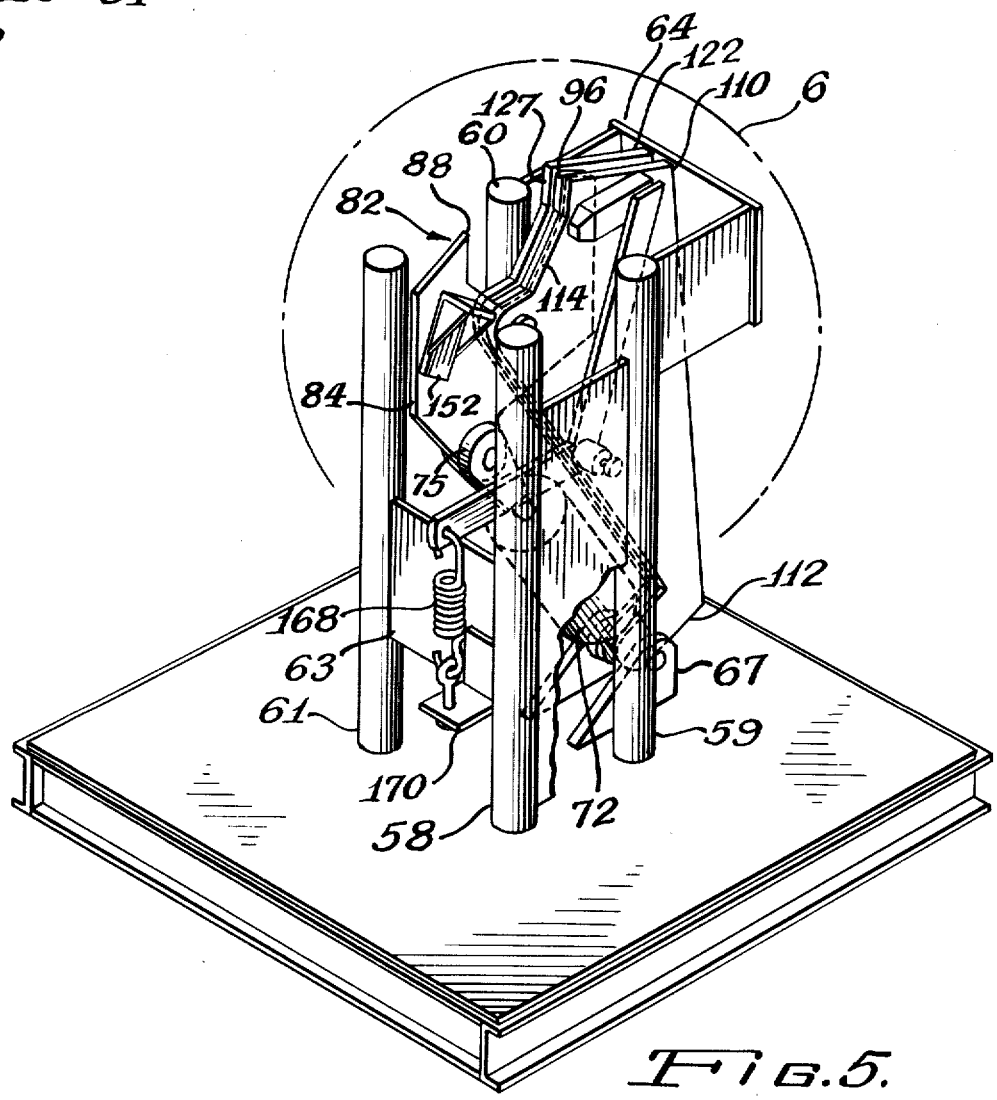
FIG. 5 is another isometric view of the tire cutter illustrated in FIG. 1 from another perspective.

Grip assembly 150 comprises a clamp 152 having a gripping surface 154 and another clamp 156 having a similar gripping surface 158. Clamp 152 is rigidly attached to movable blade member 84 in the position shown. Clamp 156 is attached to a biasing brace 160 having a vertical arm 162 integrally formed with a horizontal arm 164. The junction between arms 162 and 164 is rotatably attached to member 110 by a pin 166. Brace 160 is biased by a coil compression spring 168 attached to base 54 by a clamp 170. Alternative embodiments of spring 168 are shown in FIGS. 2 and 5. As shown in FIG. 3, gripping surfaces 154 and 158 are opposed and co-mating in order to grip tire 14 after the tire has been cut.

The apparatus operates as follows:

Assuming vehicle 10 is to be junked, it is advantageous to keep the wheels attached to the vehicle since they are made of relatively high grade steel and they each weigh from 10 to 15 pounds. However, the tires must be stripped from the vehicle. In order to achieve this goal, operator 36 lifts vehicle 10 on fork 32. By maneuvering the lift truck 30, the vehicle is positioned above blade assembly 82, in the manner shown in FIG. 1. The operator 36 then activates radio receiver 38 which sends a radio wave over antenna 40 to receiver 56. Receiver 56, in turn, operates hydraulic cylinder 72 so that piston rod 74 is retracted. In this manner, blade member 84 is moved counterclockwise, in the direction of arrow O in FIG. 2, about axis 94 to the open position shown in FIGS. 2 and 6. In the open position, a space having a width W is provided between cutting surface 86 and cutting surfaces 114, 126 (FIG. 6).

As soon as the blade members have been moved to their open position, the operator 36 causes the fork 32 to be lowered so that the tire 14 is thus disposed in the space between the cutting surface 86 and the cutting surfaces 114 and 126 as shown in FIG. 2. At this point in time, operator 36 again activates radio transmitter 38 which transmits a radio wave over antenna 40 to receiver 56. Receiver 56, in turn, causes the hydraulic cylinder 72 to extend the piston rod 74. Piston rod 74 rotates blade member 84 in a clockwise direction about axis 94, in the direction of arrow C in FIG. 7, so that the tire is firmly held between the cutting surfaces. It should be noted that the width of the space between the upper ends of cutting surfaces 86, 114 and 126 is always less than the maximum width of the space between the cutting surfaces so that the tire is urged toward lower ends 91 and 119 of the cutting surfaces. This is a significant feature that helps stabilize vehicle 10 and lift fork 32 and helps prevent tire 14 from being forced upwardly out between the blade members as the members are being closed.

Hydraulic cylinder 72 continues to move blade member 84 in the clockwise direction through the position shown in FIG. 7 until the closed position shown in FIG. 3 is achieved. While moving to the closed position, cutting surface 86 enters and travels in slot 137. In this manner, the entire cross section of tire 14, including steel cords 20 and 21, is completely severed or sheared. In addition, a small channel 172 (FIG. 4) is cut in the rim by the upper end 88 of cutting surface 86.

When the blade members are in the closed position, as shown in FIG. 3, gripping surfaces 154 and 158 comate in order to clamp tire 14 to the blade assembly. Coil spring 168 is extended in an upward direction, as illustrated in FIGS. 2 and 3, by the movement of blade member 84 to the closed position. The stretching of spring 168 applies counterclockwise torque to arm 162 so that clamp 156 is resiliently held in contact with clamp 152. This is an important feature which enables tires of various sizes to be effectively held in place. As soon as the tire is clamped in the manner shown in FIG. 3, operator 36 raises fork 32 so that vehicle 10, together with the wheel 18, are moved in an upward direction. Since tire 14 is held between clamps 152 and 156, the tire is stripped from the rim in the manner shown in FIG. 4 as the wheel and the blade members are moved apart. As soon as the tire is stripped from the rim of wheel 18, the operator again controls radio transmitter 38 so as to cause the hydraulic cylinder 72 to rotate blade member 84 in the counterclockwise direction until the members are again in the open position shown in FIG. 2. This process may be repeated for all tires mounted on vehicle 10.

Those skilled in the recognize will reccognize that only a single preferred embodiment of the invention has been disclosed herein and that the embodiments may be modified and altered without departing from the true spirit and scope of the invention as defined in the appended claims.

What is claimed is:

1. Apparatus for cutting and removing a tire from a rim of a wheel on which the tire is mounted comprising:
   a first member of preselected thickness forming a first cutting surface having an upper end and a lower end;
   a second member forming a second cutting surface having an upper end and a lower end;
   a third member forming a third cutting surface having an upper end and a lower end arranged adjacent the second member to form a slot in which the first member is movable between the second and third members in a first plane; and
   operating means for moving the first member relative to the second and third members into an open position in which the upper end of the first cutting surface is displaced from the upper ends of the second and third cutting surfaces by a first space sufficiently large to receive the width of the tire to be cut and for moving the first member relative to the second and third members into a closed position in which the second and third cutting surfaces cooperate with and guide the first cutting surface to cut the tire from the rim.

2. Apparatus, as claimed in claim 1, wherein the operating means comprises means for moving the first cutting surface at least partially into the slot when the members are in the closed position so that the tire is completely severed.

3. Apparatus, as claimed in claim 1, wherein the width of the first space is always less than the width of the maximum space separating the first cutting surface from the second and third cutting surfaces as the cutting surfaces are moved relative to each other between the open and closed positions, whereby the tire is urged away from the upper ends of said cutting surfaces toward the lower ends of said cutting surfaces so that the tire is completely retained between and cut by the cutting surfaces.

4. Apparatus, as claimed in claim 1, wherein the first cutting surface defines a first center line, the second cutting surface defines a second center line, the third cutting surface defines the third center line and the second and third center lines lie in a second plane substantially perpendicular to the first plane.

5. Apparatus, as claimed in claim 3, wherein the operating means comprises means for rotating the first member with respect to the second and third members around an axis of rotation positioned below the upper ends of the cutting surfaces so that the tire to be cut can be lowered into the first space between the first cutting surface and the second and third cutting surfaces when said members are in the open position.

6. Apparatus, as claimed in claim 1, and further comprising a cleaning finger movable within the slot as said members are moved relative to each other between the open and closed positions, whereby debris is removed from the slot.

7. Apparatus, as claimed in claim 6, wherein the cleaning finger is rigidly connected to the first member so that the cleaning finger is positioned in the slot adjacent the second and third cutting surfaces when said members are in the open position and so that the the cleaning finger moves into the slot away from the second and third cutting surfaces as said members are moved from the open position to the closed position.

8. Apparatus, as claimed in claim 1, and further comprising grip means for gripping the tire when the members are moved to the closed position, whereby the tire may be removed from the rim by pulling the wheel away from the apparatus.

9. Apparatus, as claimed in claim 8, wherein the grip means comprises:
   a first clamp connected to the first member and having a first gripping surface; and
   a second clamp connected adjacent one of the second and third members and having a second gripping surface adapted to co-mate with the first gripping surface, whereby the first and second gripping surfaces clamp the tire when the members are in the closed position.

10. Apparatus, as claimed in claim 9, wherein at least one of the first and second clamps is resiliently biased.

11. Apparatus, as claimed in claim 1, wherein the operating means includes a remote control means for moving the members between the open and closed positions from a remote location.

12. A method of removing a tire from a rim of a wheel mounted on a vehicle to be junked by using a first cutting surface having an upper end and a lower end adapted to move within a slot formed by a second cutting surface having an upper end and a lower end and a third cutting surface having an upper end and a lower end, said method comprising the steps of:
   raising the vehicle over the cutting surfaces;
   moving the cutting surfaces to an open position in which the upper end of the first cutting surface is displaced from the upper ends of the second and third cutting surfaces by a first space at least as wide as the width of the tire;
   lowering the vehicle so that the tire is moved into the first space between the first cutting surface and the second and third cutting surfaces; and
   moving the first cutting surface relatively toward the second and third cutting surfaces to a closed position in which the tire is severed by the cooperation of the cutting surfaces.

13. A method, as claimed in claim 12, wherein the step of moving said cutting surfaces to the closed position comprises the step of arranging said cutting surfaces so that said first space is always less wide than the width of the maximum space between the first cutting surface and the second and third cutting surfaces, whereby the tire is retained completely between the cutting surfaces and is completely severed.

14. A method, as claimed in claim 12, wherein the step of moving the cutting surfaces to an open position comprises the step of cleaning the slot.

15. A method, as claimed in claim 12, and further comprising the steps of:
   gripping the severed tire; and
   moving the vehicle relative to the cutting surfaces so that the tire is removed from the rim as the vehicle and the cutting surfaces are moved apart.

* * * * *